US010255318B2

(12) United States Patent
Curtiss et al.

(10) Patent No.: US 10,255,318 B2
(45) Date of Patent: Apr. 9, 2019

(54) SAMPLING A SET OF DATA

(71) Applicant: Facebook, Inc., Menlo Park, CA (US)

(72) Inventors: Michael Curtiss, Palo Alto, CA (US); Tudor Bosman, Pleasanton, CA (US)

(73) Assignee: Facebook, Inc., Menlo Park, CA (US)

( * ) Notice: Subject to any disclaimer, the term of this patent is extended or adjusted under 35 U.S.C. 154(b) by 1290 days.

(21) Appl. No.: 13/775,507

(22) Filed: Feb. 25, 2013

(65) Prior Publication Data

US 2014/0244682 A1    Aug. 28, 2014

(51) Int. Cl.
G06F 17/30        (2006.01)

(52) U.S. Cl.
CPC ............................. G06F 17/30424 (2013.01)

(58) Field of Classification Search
CPC .................................................. G06F 17/30424
See application file for complete search history.

(56) References Cited

U.S. PATENT DOCUMENTS

| 2004/0049492 | A1* | 3/2004 | Gibbons | G06F 17/30457 |
| 2004/0059743 | A1* | 3/2004 | Burger | G06F 17/30536 |
| 2005/0065944 | A1 | 3/2005 | Gunther | |
| 2005/0222965 | A1 | 10/2005 | Chaudhuri | |
| 2007/0216905 | A1* | 9/2007 | Han et al. | 356/446 |
| 2007/0233648 | A1 | 10/2007 | Zuarte | |
| 2008/0046452 | A1 | 2/2008 | Russell | |
| 2009/0018915 | A1* | 1/2009 | Fisse | 705/14 |
| 2012/0259846 | A1 | 10/2012 | Rafsky | |

FOREIGN PATENT DOCUMENTS

| JP | H07225772 A | 8/1995 |
| JP | H10232804 A | 9/1998 |
| JP | H11259518 A | 9/1999 |
| JP | 2004178191 A | 6/2004 |
| JP | 2005100392 A | 4/2005 |

OTHER PUBLICATIONS

Harangsri ("Query Result Size Estimation Techniques in Database Systems"), Apr. 1998.*
International Search Report and Written Opinion for International Application PCT/US2014/017611, dated Jun. 25, 2014.
International Publication WO 02/103578 A1, Dec. 27, 2002.
AU Office Action received for Patent Application No. 2014218817, dated Nov. 2, 2018.
Notification of Reasons for Rejection for JP Application No. 2015-558988 (with English translation), dated Jan. 16, 2018.
IL OA received for Patent Application No. 240580. (with English Translation), dated May 31, 2018.

* cited by examiner

Primary Examiner — James Trujillo
Assistant Examiner — Hubert Cheung
(74) Attorney, Agent, or Firm — Baker Botts L.L.P.

(57) ABSTRACT

In one embodiment, a method includes receiving a search query by one or more computing devices. A set of data objects to search are identified, and then an operation is executed. The operation involves stepping through the set of data objects with a step size of N, and at each step determining whether the object is responsive to the query. If the end of the set is reached before Y data objects are determined to be responsive, and X or more data objects are determined to be responsive, then an estimate of the number of responsive data objects in the set is provided. Otherwise, N is modified and the operation is re-executed.

18 Claims, 4 Drawing Sheets

SAMPLING A SET OF DATA

TECHNICAL FIELD

This disclosure generally relates to sampling a data set.

BACKGROUND

Computers may be used to search for particular data objects using search queries. Data objects may be information stored in a memory element of a computer, such as text strings, numbers, or metadata associated with objects such as pictures, videos, etc. A data object may have one or more searchable characteristics associated with the data objects. A search query may be used to search for a particular type of data object or for data objects having one or more associated characteristics. Search queries may be entered using any suitable method, such as text strings, hypertext, or a search query language such as SQL. Structured queries may be used to perform search queries that have multiple constraints on the type of data object or particular data-object characteristics searched for.

SUMMARY OF PARTICULAR EMBODIMENTS

A search query may be used to search for data objects in a data set. As data sets become larger, identifying each data object in the data set that is responsive to a search query becomes more resource-intensive. In those instances, it may be desirable to sample a subset of the data objects from the data set to run the search query on.

When a data set is not randomly organized with respect to particular data objects or attributes of data objects, care must be taken to create a subset of data objects that accurately represents the full data set. The same considerations apply when estimating the number of data objects in a data set that are responsive to a given search query. If the subset of data objects is not representative of the larger data set, then counting objects in the subset responsive to a search query may not be an effective method of accurately estimating the number of objects in the larger data set responsive to the search query.

An example method of creating a subset of data objects responsive to a search query or counting the number of data objects in a data set responsive to the search query includes receiving a search query and identifying a set of data objects to search. The method involves stepping through the set of data objects with a step size of N, and at each step determining whether the object is responsive to the query. If the end of the set is reached before Y data objects are determined to be responsive, and X or more data objects are determined to be responsive, then an estimate of the number of responsive data objects in the set is provided. Otherwise, if Y or more data objects have been determined to be responsive to the search query before the end of the data set is reached or fewer than X data objects have been determined to be responsive, then N is modified and the method is re-executed.

DESCRIPTION OF EXAMPLE EMBODIMENTS

Figure 1:
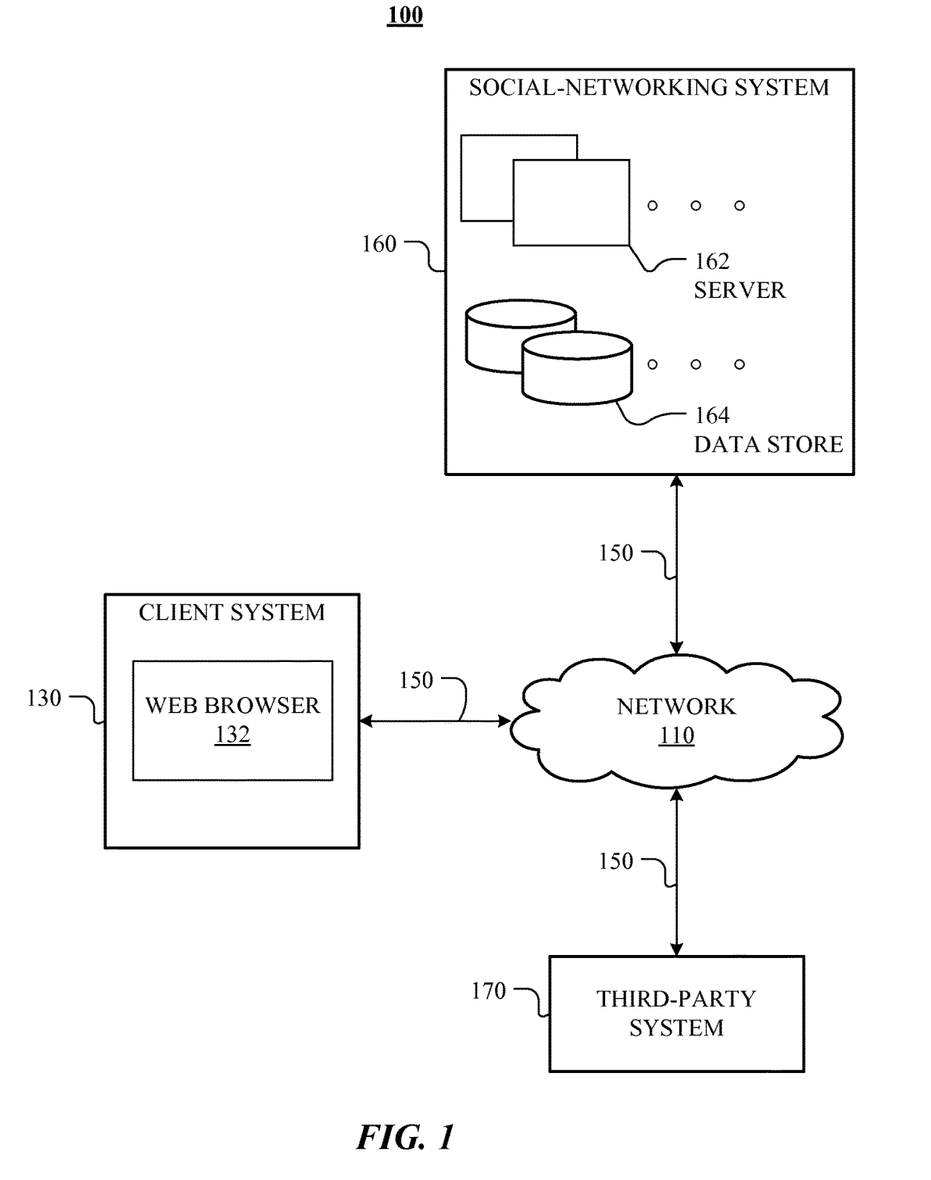
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

A search query may be used to search for data objects in a data set. For example, in the context of a social network data objects may represent users, places, posts, advertisements, pictures or other graphical content, notifications, or any other suitable data object. As another example, data objects may represent web pages. A search query may be performed for a particular type of data object, such as all data objects that are pictures. A search query may also be used to search for data objects having one or more particular characteristics or attributes. For example, a user data object may have preferences of the user or information about the user associated with the user data object, such as the user's connections, likes, or activities. As another example, an advertising data object may have attributes associated with the advertising data object, such particular text, graphics, or other media. While the above disclosure provides specific examples of types of data objects and attributes of data objects in the context of a social-networking system, this disclosure contemplates any suitable data objects or attributes of data objects in any suitable context.

As data sets become larger, identifying each data object in the data set that is responsive to a search query becomes more resource-intensive. In these instances, it may be desirable to sample a subset of the data objects from the data set to run the search query on. For instance, if a data set has one billion or more data objects, it may be desirable to run a search query on a subset of one million data objects, with the one million data objects being representative of the larger data set.

When a data set is not randomly organized with respect to particular data objects or attributes of data objects, care must be taken to create a subset of data objects that accurately represents the full data set. For example, data objects may be stored in a data set in the order that they are created, and one or more attributes of the data objects may correlate with the time of creation. For example, data objects may represent individuals who have responded to a certain offer. If the offer was initially provided in select geographical areas, then the geographic areas of the initial data objects (the initial individuals) will be biased towards those areas where the offer was first provided. When the offer is subsequently offered to a larger geographic area, the initial set of data objects will not be representative of the entire set of data objects.

As another example of potential biases that a data set may present, a social network may identify users with an identifying number. If the numbers are not randomly assigned, then the order of the data objects in the set may be biased towards certain user characteristics. For example, if the social network was first available to a group of users with certain common characteristics, then the identifying numbers correspond to users that are biased towards those common characteristics. As a result, sampling the users having the first n user numbers will include a set of users that are biased towards certain characteristics, resulting in a sample that may not be representative of the entire group of users of the social network.

The same considerations apply when estimating the number of data objects in a data set that are responsive to a given search query. If the data set is large, a subset of data objects may be used to conserve resources or reduce the time taken for the search query to run. If the subset of data objects is not representative of the larger data set, then counting objects in the subset responsive to a search query may not be an effective method of accurately estimating the number of objects in the larger data set responsive to the search query.

The examples above illustrate that subsets of a set of data objects may be biased towards certain types of data objects, towards data objects with certain characteristics, or both. Resource considerations often require analyzing a data set without analyzing each data object in the set, and thus care must be taken to avoid creating subsets of data objects that contain biases when the subsets are intended to be representative of the full data set. While the examples above describe particular types of data objects and particular ways those data objects may be biased in particular contexts, this disclosure contemplates any suitable types of data objects in any suitable context and recognizes that those data objects may be biased in any number of ways for any number of reasons.

Figure 2:
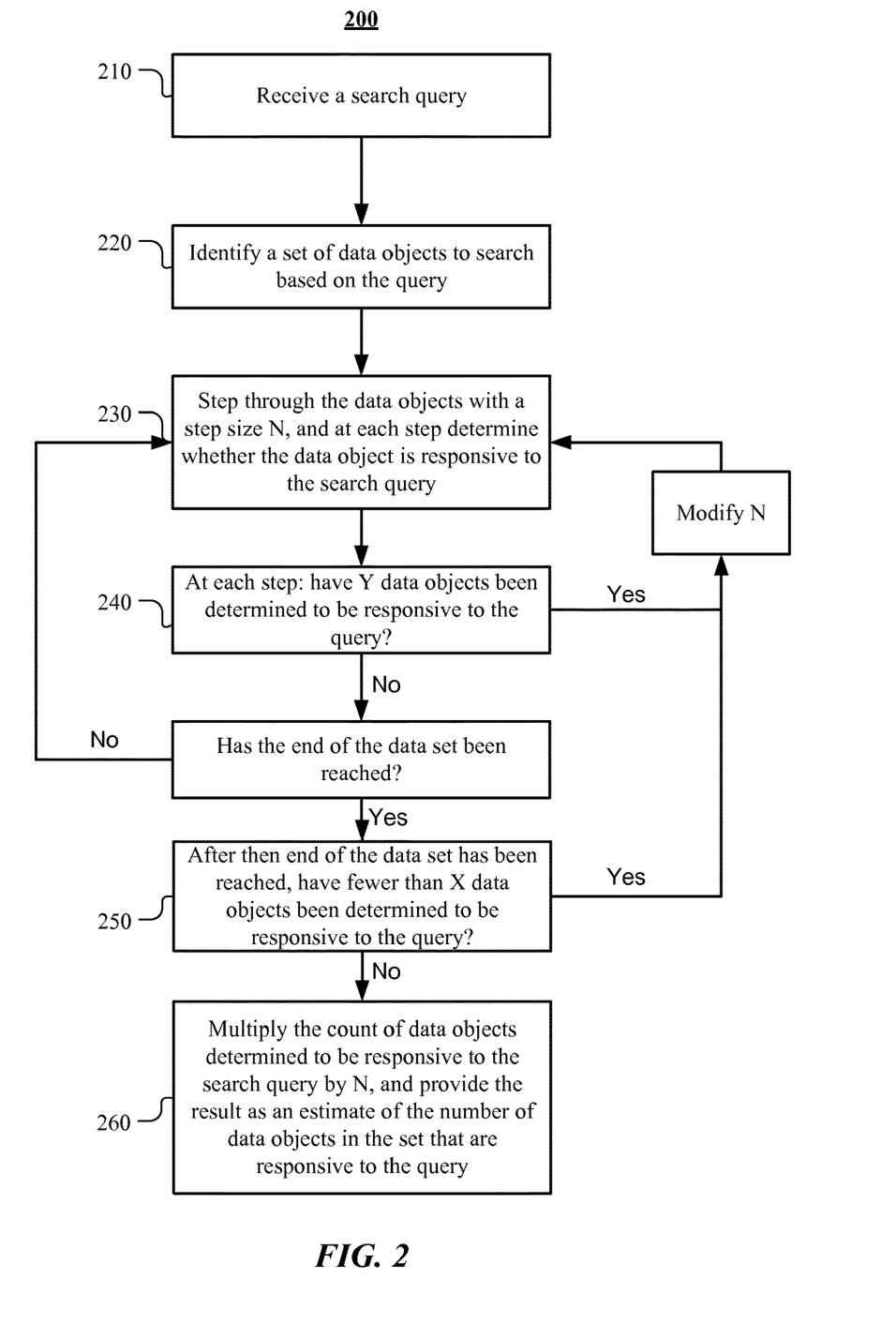
FIG. 2 illustrates an example method for estimating the number of data objects responsive to a search query.

FIG. 2 illustrates an example computer-implemented method 200 for generating an estimate of the number of data objects in a data set that are responsive to a search query. The method may begin at step 210, where a search query is received. The search query may be for particular types of data objects, data objects with particular attributes, or both. In particular embodiments, a search query may contain multiple constraints on the type of data objects searched for, the attributes of the data objects searched for, or both. For example, a search query directed toward users of a social network may query those users who like We Are Augustines and are college graduates.

At step 220, a set of data objects is indentified to perform the search query on. In particular embodiments, the set of data objects may be stored on more than one server, hard drive, or other suitable storage device. In particular embodiments, the set of data objects may be stored as multiple data sets on a single server, hard drive, or other suitable storage device. For example, the data set to be queried may include more than one database or more than one partitions of a database, such as multiple shards. In particular embodiments, the search query may be ran on storage device, database, or partitions at a time. In particular embodiments, the search query may be ran simultaneously on multiple storage devices, databases, or partitions.

At step 230, the method steps through the data set identified in step 220 with a step size N. In other words, the method considers a first data object, considers a second data object existing N data objects away, considers a third data object existing N data objects away from the second data objects, and so on. N may vary based on the type of data objects searched for or an estimate of the total data objects in the data set. For example, in the context of a social network there may be many more pictures than users. As a result, N may be larger number when the data objects relate to pictures than when the data objects relate to users. For each selected data object it is determined whether that data object is responsive to the search query. In particular embodiments, a count of the data objects responsive to the query is maintained. In particular embodiments, each data object that is responsive to the search query is selected, tagged, linked to, or otherwise indicated as being responsive to the search query. In particular embodiments, data objects are stepped through by identifying and stepping through the memory address corresponding to the data objects, for example by using a memory addressing algorithm. This disclosure contemplates using any suitable method or process for stepping through the data objects.

Each time a data object is determined to be responsive in step 230, the method determines in step 240 whether Y data objects have been determined to be responsive to the search query. If fewer than Y data objects have been determined to be responsive, the method continues as indicated by step 230. If Y or more data objects have been determined to be responsive to the search query, N is modified and the method of step 230 is began anew using the modified value of N. For example, N may be increased, for instance by being doubled, when Y or more data objects have been determined to be responsive to the search query. This disclosure contemplates modifying N using any suitable algorithm.

If Y data objects have not been determined to be responsive to the search query, step 230 is continued, and at some point the end of the data set is reached. As illustrated by step 250, if the end of the data set has been reached and fewer than X objects have been determined to be responsive to the search query, N is modified and the method is began anew at step 230. In particular embodiments, N may be decreased, for example by halving N and then rounding N to the nearest whole number. This disclosure contemplates modifying N using any suitable algorithm.

If the end of the dataset has been reached and X or more data objects have been determined to be responsive to the search query, the number of data objects in the full data set is estimated using the count of data objects responsive to the search query maintained during the during the operation. For example, as illustrated in step 260, the number of data objects in the full data set may be estimated by multiplying the count of data objects determined to be responsive to the search query by the step size N most recently used. This result may then be provided, for example to the originator of the search query or the entity executing the search query.

Figure 3:
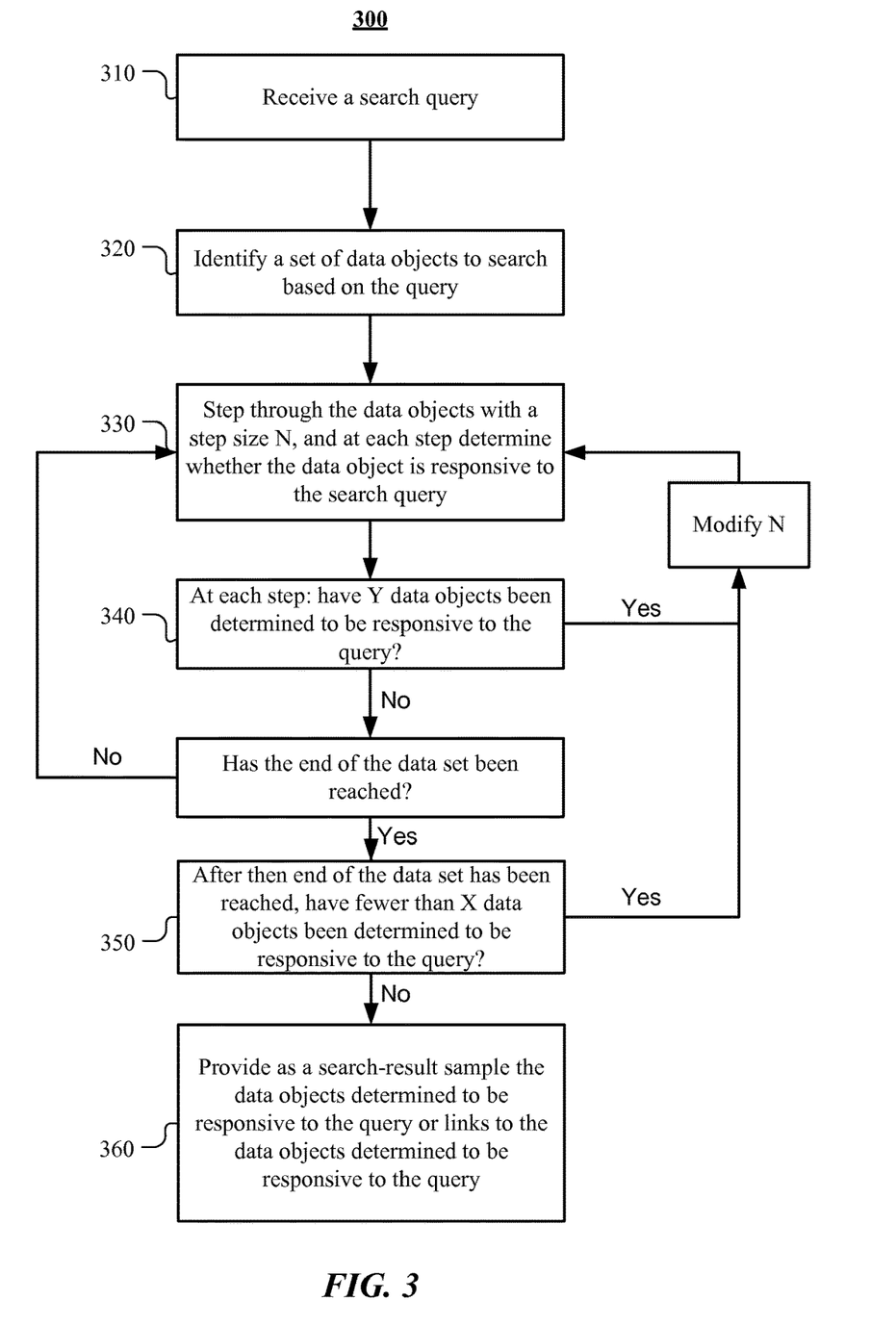
FIG. 3 illustrates an example method for providing a sample of data objects responsive to a search query.

FIG. 3 illustrates an example computer-implemented method 300 for providing a sample of data objects responsive to a search query. Steps 310 through 350 are identical to steps 210 through 250, described above. However, at step 360, if the end of the data set is reached and X or more data objects have been determined to be responsive to the search query, the data objects are provided as a sample of the data objects in the larger data set that are responsive to the search query. In particular embodiments, links to the data objects representing the sample may be provided.

Particular embodiments may repeat one or more steps of the methods of FIG. 2 or 3, where appropriate. Although this disclosure describes and illustrates particular steps of the methods of FIGS. 2 and 3 as occurring in a particular order, this disclosure contemplates any suitable steps of the methods of FIGS. 2 and 3 occurring in any suitable order. Moreover, although this disclosure describes and illustrates particular components, devices, or systems carrying out particular steps of the methods of FIGS. 2 and 3, this disclosure contemplates any suitable combination of any suitable components, devices, or systems carrying out any suitable steps of the methods of FIGS. 2 and 3.

Figure 4:
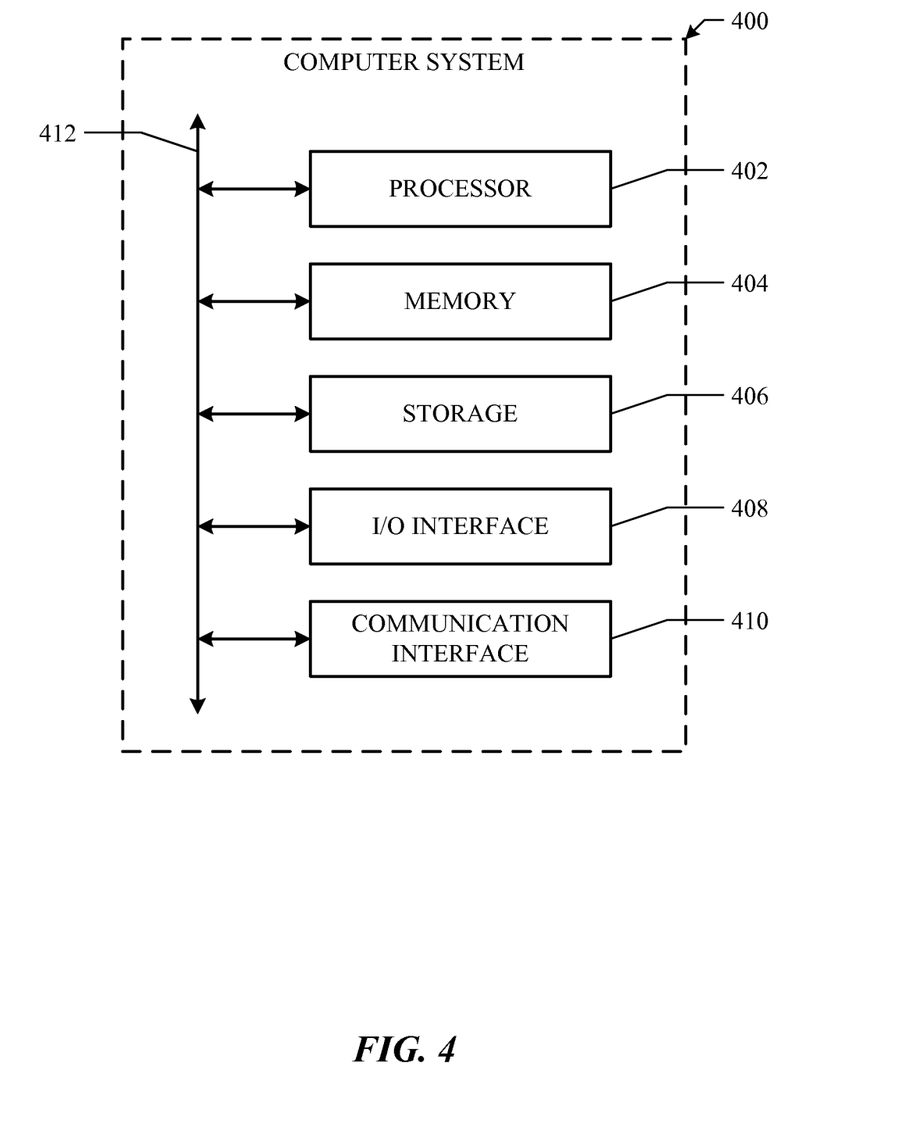
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate.

Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by one or more computing devices, receiving a search query;
by one or more computing devices, identifying a set of data objects to search based on the search query; and
by one or more computing devices, executing an operation evaluating the search query on a first subset of the set of data objects, comprising:
stepping through the set of data objects with a step size of N;
determining, at each step, whether the data object at that step is responsive to the search query;
counting the number of data objects that are determined to be responsive to the search query; and
if the end of the set is reached after X or more data objects are determined to be responsive to the search query and before Y data objects are determined to be responsive to the search query:
then multiplying the count of the data objects determined to be responsive to the search query by N and providing the result as an estimate of a number of data objects in the set that are responsive to the query;
else modifying N and re-executing the operation on a second subset of the set of data objects,
wherein N, X, and Y have pre-determined values based on a data-object type of the data objects in the set.

2. The method of claim 1, wherein modifying N comprises increasing N if Y data objects are determined to be responsive to the search query before the end of the set is reached.

3. The method of claim 2, wherein increasing N comprises doubling N.

4. The method of claim 1, wherein modifying N comprises decreasing N if the end of the set is reached and fewer than X data objects are determined to be responsive to the search query.

5. The method of claim 1, wherein the data objects comprise web pages.

6. The method of claim 1, wherein the data objects comprise user profiles of a social-networking system.

7. The method of claim 1, wherein the data objects comprise photographs.

8. The method of claim 1, wherein stepping through the set of data objects with step size N comprises stepping through the set of data objects with step size N using a memory addressing algorithm.

9. The method of claim 1, further comprising, by one or more computing devices, searching the set of data objects based on the search query during the operation.

10. A method comprising:
by one or more computing devices, receiving a search query;
by one or more computing devices, identifying a set of data objects to search based on the search query; and
by one or more computing devices, executing an operation evaluating the search query on a subset of the set of data objects, comprising:
stepping through the set of data objects with a step size of N;
determining, at each step, whether the data object at that step is responsive to the search query;
counting the number of data objects that are determined to be responsive to the search query; and
if the end of the set is reached after X or more data objects are determined to be responsive to the search query and before Y data objects are determined to be responsive to the search query:
then providing as a search-result sample the data objects determined to be responsive to the query or links to the data objects determined to be responsive to the query;
else modifying N and re-executing the operation on a second subset of the set of data objects,
wherein N, X, and Y have pre-determined values based on a data-object type of the data objects in the set.

11. The method of claim 10, wherein modifying N comprises increasing N if Y data objects are determined to be responsive to the search query before the end of the set is reached.

12. The method of claim 11, wherein increasing N comprises doubling N.

13. The method of claim 10, wherein modifying N comprises decreasing N if the end of the set is reached and fewer than X data objects are determined to be responsive to the search query.

14. The method of claim 10, wherein the data objects comprise web pages.

15. The method of claim 10, wherein the data objects comprise user profiles of a social-networking system.

16. The method of claim 10, wherein the data objects comprise photographs.

17. The method of claim 10, further comprising, by one or more computing devices, searching the set of data objects based on the search query concurrently with the operation.

18. The method of claim 10, wherein stepping through the set of data objects with step size N comprises stepping through the set of data objects with step size N using a memory addressing algorithm.

* * * * *